(12) United States Patent
George et al.

(10) Patent No.: US 10,996,864 B1
(45) Date of Patent: May 4, 2021

(54) AGGREGATING ALUA STATUSES FROM MULTIPLE ARRAYS

(71) Applicant: EMC Corporation, Hopkinton, MA (US)

(72) Inventors: Subin George, Framingham, MA (US); Shwetha Handral Sridhara, Bangalore (IN); Arieh Don, Newton, MA (US); Mavvureddypatty Senguden Manickavasaham, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 847 days.

(21) Appl. No.: 15/065,353

(22) Filed: Mar. 9, 2016

(51) Int. Cl.
*G06F 3/06* (2006.01)

(52) U.S. Cl.
CPC ............ *G06F 3/0619* (2013.01); *G06F 3/065* (2013.01); *G06F 3/0665* (2013.01); *G06F 3/0689* (2013.01)

(58) Field of Classification Search
CPC .... G06F 3/0631; G06F 3/0604; G06F 3/0643; G06F 3/067; G06F 3/0689; G06F 17/30138; G06F 17/30194; H04L 67/1097
See application file for complete search history.

(56) References Cited

U.S. PATENT DOCUMENTS

| | | | |
|---|---|---|---|
| 8,793,343 B1 * | 7/2014 | Sorenson, III | G06F 17/30203 709/219 |
| 9,268,496 B2 * | 2/2016 | Anumalasetty | G06F 3/0635 |
| 2013/0024639 A1 * | 1/2013 | Yamamoto | G06F 3/0617 711/165 |
| 2013/0243006 A1 * | 9/2013 | Otsuka | H04L 12/4604 370/401 |
| 2015/0288567 A1 * | 10/2015 | Lin | H04L 41/0856 370/254 |
| 2016/0006810 A1 * | 1/2016 | Chiba | G06F 13/14 709/219 |

OTHER PUBLICATIONS

Merriam-Webster, Serial Number—Definition and More From the Free Merriam-Webster Dictionary, Aug. 2014 [retrieved from internet Apr. 16, 2018][<URL:https://web.archive.org/web/20140824165051/http://www.merriam-webster.com/dictionary/serial%20number>] (Year: 2014).*

* cited by examiner

*Primary Examiner* — David Yi
*Assistant Examiner* — Nicholas A. Paperno
(74) *Attorney, Agent, or Firm* — Anderson Gorecki LLP

(57) ABSTRACT

In response to a target port group state query from a host, the storage arrays that present a replicated volume to the host aggregate port group state of the storage arrays into a single logical target port group state that is provided to the host. The storage array that receives the query from the host may prompt other storage arrays to provide target port group state and combine the responses from all storage arrays. Port IDs may be translated into unique port IDs so that the logical target port group state does not include repeated port IDs.

20 Claims, 3 Drawing Sheets

AGGREGATING ALUA STATUSES FROM MULTIPLE ARRAYS

BACKGROUND

The subject matter of this disclosure is generally related to data storage systems that can be used to maintain large data sets and support multiple concurrent users. The basic building blocks of the data storage system may include computing nodes that manage access to data storage components such as disk drives and flash drives. The computing nodes may be "vanilla" servers with storage management software or specialized hardware platforms such as storage engines or storage directors. A storage array may include multiple computing nodes, and a data storage system may include multiple storage arrays. Each storage array presents one or more logical volumes of storage which are abstractions of the data storage components. The data storage system may be accessed by, or via, a host device. For example, instances of an application running on the host device may access data, or applications running on other computers may prompt data access by sending IOs to the host device. The host device accesses data by communicating with the storage arrays with reference to the logical volumes. The computing nodes maintain the abstraction layer between the host and the data storage components.

SCSI (small computer system interface) is a set of standards for, among other things, data access between computers. For example, SCSI describes how the host device can learn the status of ports of the storage array with which the host is associated, which is helpful if some ports are inactive. However, the ports can only be designated as either active or inactive, which is problematic where the storage array has both primary and standby ports because although the standby ports are active, they are not optimized, and thus may provide poor performance. ALUA (Asymmetric Logical Unit Access) is a standardized protocol extension of SCSI. ALUA enables the host to learn which ports of the storage array are active optimized, active non-optimized, and inactive. For example, the host may send a TPG (Target Port Group) status query to the storage array to obtain an indication of which ports are optimized, non-optimized and inactive. The MPIO (Multipath Input-Output) framework can be used by the host to load balance IOs across the optimized ports.

SUMMARY

All examples, aspects and features mentioned in this document can be combined in any technically possible way.

Some aspects of the invention may be predicated in-part on recognition that ALUA does not support host discovery of port status for a replicated volume that is presented to the host by multiple storage arrays configured for active-active remote replication. More particularly, ALUA allows only one TPG per array so the ports of both arrays cannot be included in the same TPG in accordance with the current state of the art. Further, multiple TPGs cannot be used to represent the different storage arrays if an MPIO driver is used because MPIO usually does not support load balancing and other operations across multiple TGPs.

In accordance with an aspect an apparatus comprises: a first storage array that presents a first logical volume, the first storage array comprising a plurality of ports; a second storage array that presents a second logical volume, a replicated volume that appears to a host as a single volume comprising the first logical volume and the second logical volume, the second storage array comprising a plurality of ports and being interconnected with the first storage array via a network; the first storage array comprising a processor responsive to a first target port group query from the host to obtain target port state of the plurality of ports of the second storage array and combine the obtained target port state with target port state of the plurality of ports of the first storage array to generate a logical target port group state, and to send the logical target port group state to the host in response to the first target port group query. In some implementations the first storage array obtains target port state of the plurality of ports of the second storage array by forwarding the first target port group query to the second storage array. In some implementations the first storage array obtains target port state of the plurality of ports of the second storage array by sending a second target port group query to the second storage array. In some implementations the second storage array sends a target group state report for the plurality of ports of the second storage array to the first storage array. In some implementations the second storage array translates port IDs of the plurality of ports into unique port IDs which are used in the target port state of the plurality of ports of the second storage array sent to the first storage array. In some implementations the logical target port state indicates individual ports of the plurality of ports of the first storage array and the plurality of ports of the second storage array to be at least one of optimized, non-optimized and inactive. In some implementations the host comprises an MPIO (Multipath Input-Output) driver that directs host access requests to host ports associated with the logical target port group. In some implementations port IDs of the plurality of ports of the second storage array are translated by a processor into unique port IDs used in the target port state of the plurality of ports of the second storage array. In some implementations the processor translates the port IDs by concatenating the port IDs with at least a part of a serial number of the second storage array. In some implementations the processor translates the port IDs by concatenating the port IDs with a multiple of maximum port count.

In accordance with an aspect a method comprises: a first storage array presenting a first logical volume, the first storage array comprising a plurality of ports; a second storage array presenting a second logical volume, where a replicated volume comprises the first logical volume and the second logical volume, the second storage array comprising a plurality of ports and being interconnected with the first storage array via a network; and responsive to a first target port group query sent from a host to the first storage array: obtaining target port state of the plurality of ports of the second storage array; combining the obtained target port state with target port state of the plurality of ports of the first storage array to generate a logical target port group state; and sending the logical target port group state to the host. In some implementations the method comprises the first storage array obtaining the target port state of the plurality of ports of the second storage array by forwarding the first target port group query to the second storage array. In some implementations the method comprises the first storage array obtaining the target port state of the plurality of ports of the second storage array by sending a second target port group query to the second storage array. In some implementations the method comprises the second storage array sending a target group state report for the plurality of ports of the second storage array to the first storage array. In some implementations the method comprises the second storage array translating port IDs of the plurality of ports into unique port IDs which are used in the target port state of the plurality of ports of the second storage array sent to the first storage array. In some implementations the method comprises the logical target port state indicating individual ports of the plurality of ports of the first storage array and the plurality of ports of the second storage array to be at least one of optimized, non-optimized and inactive. In some implementations the method comprises a host MPIO (Multipath Input-Output) driver directing host access requests to host ports associated with the logical target port group. In some implementations the method comprises translating port IDs of the plurality of ports of the second storage array into unique port IDs used in the target port state of the plurality of ports of the second storage array. In some implementations the method comprises translating the port IDs by concatenating the port IDs with at least a part of a serial number of the second storage array. In some implementations the method comprises translating the port IDs by concatenating the port IDs with a multiple of maximum port count.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network, e.g. and without limitation via a standard protocol such as SCSI and ALUA. A "volume" is a logical unit of storage presented by a storage system for use by host applications. The storage system manages the underlying tangible storage components used to implement the storage services for the volume. A "data device" is a logical unit of storage that is used within a storage array to manage access to tangible storage components that are used to deliver storage services. A "storage resource pool" is a collection of data devices.

Figure 1:
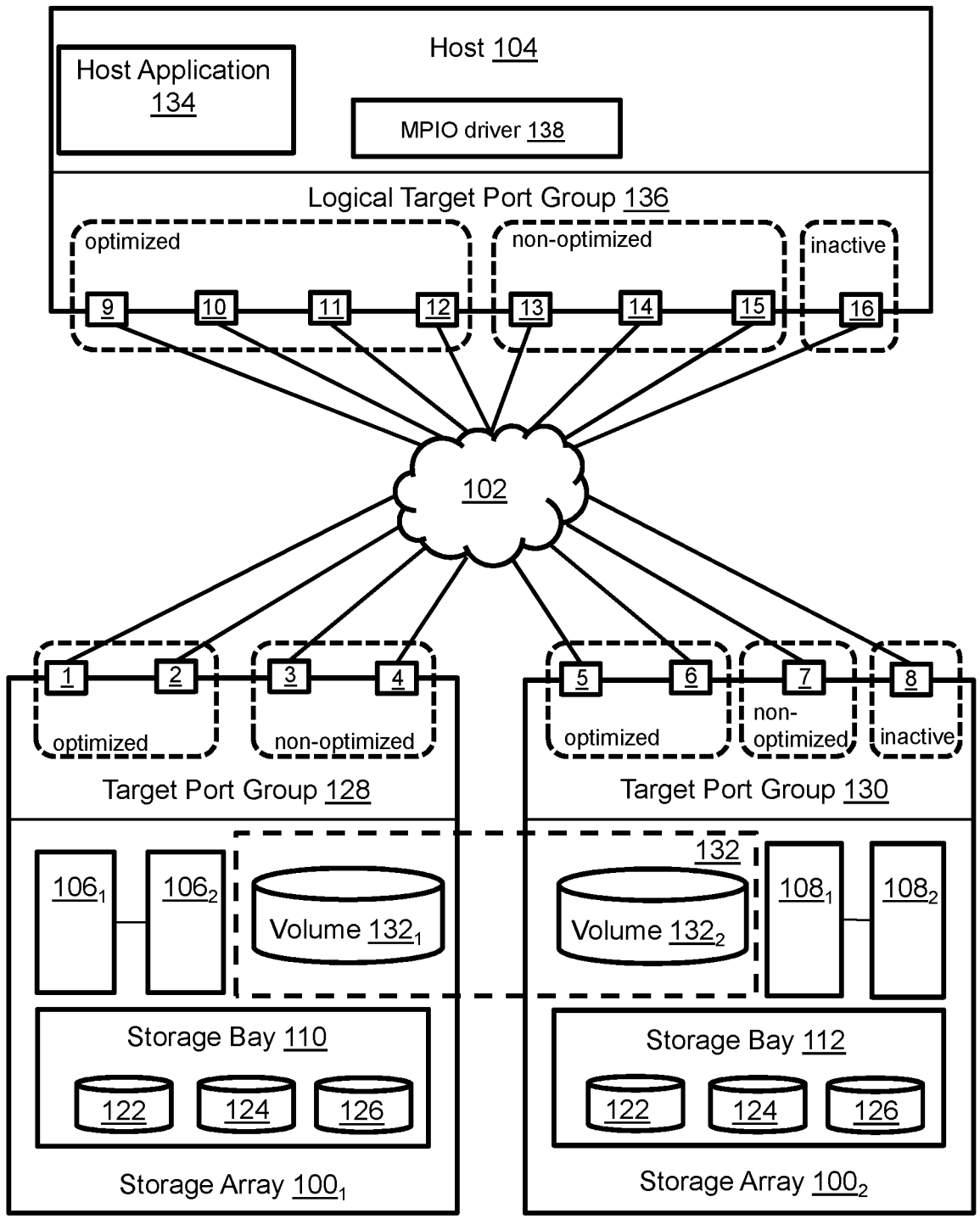
FIG. 1 illustrates a data storage system with multiple storage arrays configured for active-active remote replication.

FIG. 1 illustrates a data storage system with multiple data storage arrays $100_1$, $100_2$ configured for active-active remote replication. Although only two storage arrays are illustrated for ease of exposition, the data storage system may have more than two storage arrays. The storage arrays $100_1$, $100_2$ are interconnected by a network 102 that may include various network nodes, e.g. switches, routers, hubs, and other network devices. For context and without limitation the network 102 may include one or more of a WAN (wide area network), MAN (metropolitan area network) and LAN (local area network). A host 104 is connected to the storage arrays $100_1$, $100_2$ via the network 102.

The storage arrays $100_1$, $100_2$ include one or more interconnected computing nodes $106_1$-$106_2$, $108_1$-$108_2$, respectively, and an associated storage bay 110, 112, respectively. The computing nodes may include "vanilla" storage servers or specialized hardware platforms including but not limited to storage directors or storage engines. The storage bays 110, 112 may include tangible data storage components of various different technology types, e.g. and without limitation flash drives 122, 15 k disk drives 124 and 7 k disk drives 126. Within each storage array, each computing node is connected to every other computing node via point-to-point links of an interconnecting fabric. Each storage array is connected to the network 102 via ports of a target port group. In the illustrated example, storage array $100_1$ includes ports 1, 2, 3, and 4 of target port group 128, and storage array $100_2$ includes ports 5, 6, 7, and 8 of target port group 130. Although not specifically shown, each port may be associated with a specific computing node. For example, ports 1 and 3 may respectively be primary and standby ports of computing node $106_1$, ports 2 and 4 may respectively be primary and standby ports of computing node $106_2$, ports 5 and 7 may respectively be primary and standby ports of computing node $108_1$, and ports 6 and 8 may respectively be primary and failed ports of computing node $108_2$. An ALUA (or other) status is associated with each port. In the illustrated example ports 1, 2, 5 and 6 have active "optimized" status, ports 3, 4 and 7 have active "non-optimized" status, and port 8 has "inactive" status.

A replicated volume 132 including volumes $132_1$ and $132_2$ is presented by the storage system. Volume $132_1$ is presented by storage array $100_1$ and corresponding volume $132_2$ is presented by storage array $100_2$. Consistency is maintained between volume $132_1$ and volume $132_2$ via communications between storage array $100_1$ and storage array $100_2$. For example, a write to volume $132_1$ is communicated from storage array $100_1$ to storage array $100_2$ so that the write is implemented on both volumes $132_1$, $132_2$. The replicated volume 132 and associated data storage components can be accessed via the ports of either storage array.

The host 104 may be a tangible server computer or a virtual host associated with a virtual machine or container running on a tangible server. The host operates a host application 134 that utilizes the storage resources of the storage arrays. For example and without limitation, the host application could be a database, file server or block server. The host includes multiple ports 9, 10, 11, 12, 13, 14, 15, 16 via which the host is connected to the network 102. In particular, the host ports are part of a logical target port group 136 corresponding to a logical storage array that includes both storage array $100_1$ and storage array $100_2$. Corresponding port pairs are associated with paths between the host and ports of the storage arrays. In particular, port 16 corresponds to port 8, ports 9, 10, 11 and 12 correspond to ports 1, 2, 5 and 6, respectively, and ports 13, 14 and 15 correspond to ports 3, 4 and 7, respectively. From the perspective of the host, the logical target port group 136 is a standard ALUA target port group. Consequently, the host may function in accordance with the SCSI and ALUA standards, and MPIO driver 138 can control host application access to the ports of both storage arrays 100$_1$, 100$_2$, thereby enabling port selection, load balancing and other functions across multiple storage arrays.

Figure 2:
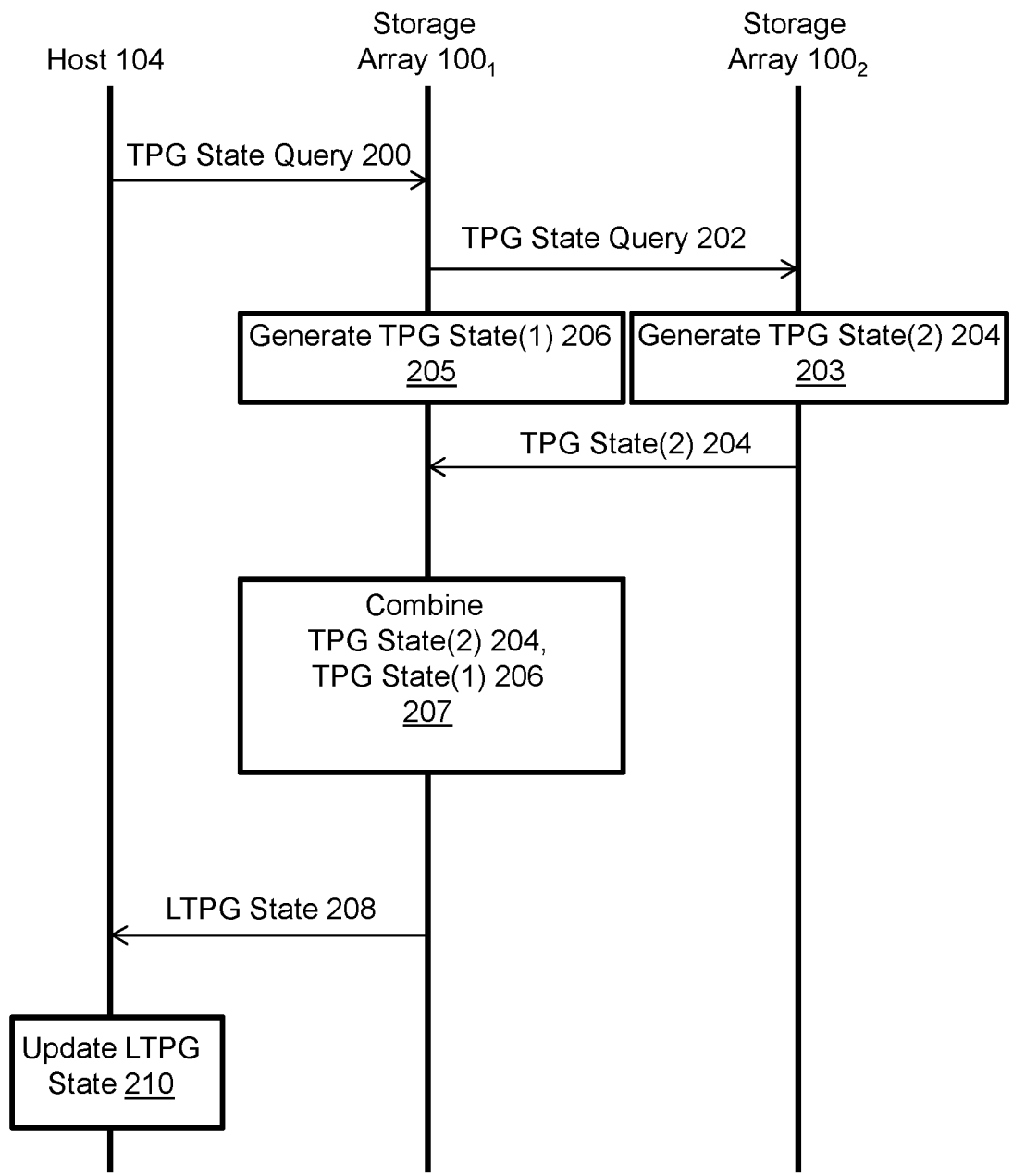
FIG. 2 illustrates logical target port group port status update.

A logical target port group 136 port status update will now be described with reference to FIGS. 1 and 2. In order to obtain a port status update the host 104 sends an ALUA TPG (target port group) state query 200 via any one of the host ports, and thus to either of the storage arrays. For purposes of explanation, the host sends the TPG state query via port 9 so storage array 100$_1$ receives the TPG state query on port 1. The storage arrays are aware of the active-active replication configuration and have known IDs such as node 1 (storage array 100$_1$) and node 2 (storage array 100$_2$). The TPG state query 200 may be a standard ALUA query because the host is not aware that the logical target port group is not an actual target port group. In response to the TPG state query 200, storage array 100$_1$ sends a TPG state query 202 to storage array 100$_2$. For example, storage array 100$_1$ may relay the ALUA TPG state query 200 from the host as TPG state query 202, possibly after some modification, or generate a new TPG state query 202. The TPG state query 202 may be sent from storage array 100$_1$ to storage array 100$_2$ via a network path used to maintain consistency of the replicated volume. Storage array 100$_2$ receives the TPG state query 202 and, in response, generates a TPG state report for storage array 100$_2$ in operation 203, where the state report for storage array 100$_2$ is illustrated as TPG State(2) 204. In a parallel operation 205 storage array 100$_1$ generates a TPG state report for storage array 100$_1$, illustrated as TPG State (1) 205. Storage array 100$_2$ sends TPG state(2) 204 to storage array 100$_1$. Storage array 100$_1$ combines TPG state (2) 204 and TPG state(1) 206 in operation 207, thereby generating LTPG (logical target port group) state report 208. Storage array 100$_1$ sends LTPG state report 208 to host 104 where it is used to update the state of logical target port group 136 in operation 210.

Figure 3:
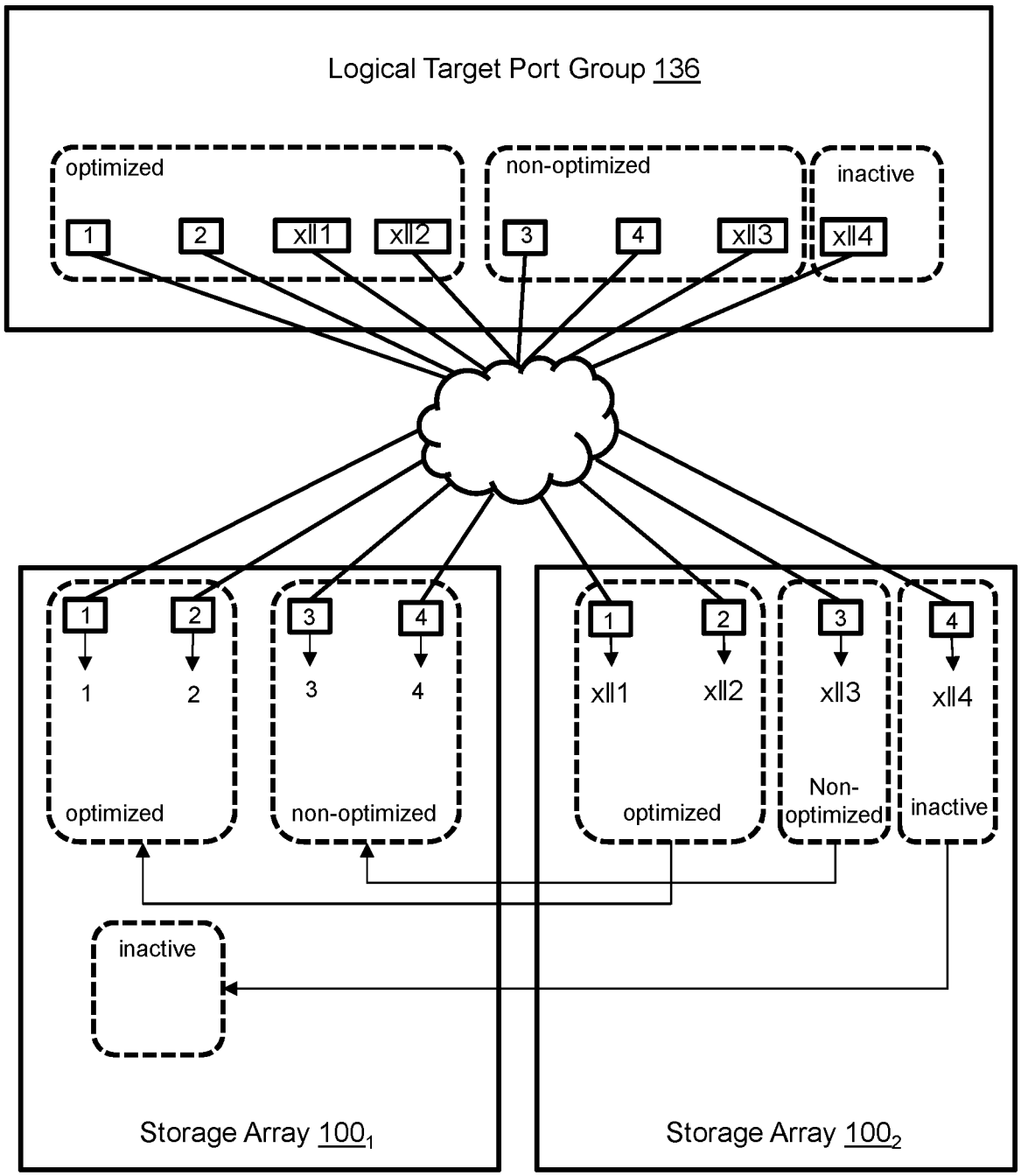
FIG. 3 illustrates an aspect of combining multiple target port group state reports so that port IDs are unique.

Referring to FIG. 3, the operation (207, FIG. 2) of combining the TPG states of storage array 100$_1$ and storage array 100$_2$ and of generating TPG state (203, 205, FIG. 2) may include translation of actual target port IDs to unique logical target port IDs. In the illustrated example both storage array 100$_1$ and storage array 100$_2$ include four ports having the respective target port IDs 1, 2, 3 and 4. In order to avoid sending a LTPG state (208, FIG. 2) in which port 4 is both non-optimized and inactive, at least one of the ports having port ID 4 is assigned a new unique ID for purposes of the logical target port group 136. In other words, all port IDs of the LTPG state report may be unique within the set of port IDs associated with the logical target port group. A wide variety of techniques could be used to create the new unique ports IDs. For example and without limitation, the port IDs may be concatenated with all or part of the serial number of the storage array with which they are associated, or combined with a multiple of a value X using a mathematical operation. For example, X could be the maximum possible port count of each storage array or some other known value. In one implementation storage array 100$_1$ uses port IDs 1, 2, 3 and 4 while storage array 100$_2$ concatenates the actual port IDs with the value X. If there were third and fourth storage arrays they would concatenate the actual port IDs with the values 2X and 3X respectively. The multiplier of X can be related to the node IDs. For example, node 1 may use the multiplier 1, node 2 may use the multiplier X, node 3 may use the multiplier 2X and node 4 may use the multiplier 3X. Thus, each storage array knows which multiplier to use based on its ID and also which multipliers are used by other storage arrays based on their IDs. Translating the port IDs into unique logical port IDs enables the logical target port group 136 to represent all of the ports of the logical storage array including storage array 100$_1$ and storage array 100$_2$ without repeated port IDs.

As mentioned above, the host may send a state query to either storage array. If the state query is sent to storage array 100$_2$ then the roles of the storage arrays in responding to the query are reversed. Moreover, if there are more than two storage arrays then the storage array that receives the TPG state query from the host sends TPG state queries to every other storage array and then combines the responses from those storage arrays.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a first storage array that presents a first logical volume, the first storage array comprising a plurality of ports;
   a second storage array that presents a second logical volume, the second storage array comprising a plurality of ports and being interconnected with the first storage array via a network;
   a replicated volume that appears to a host as a single volume, the replicated volume comprising the first logical volume and the second logical volume;
   the first storage array comprising a processor responsive to a first target port group query from the host to obtain target port state of the plurality of ports of the second storage array, to combine the obtained target port state with target port state of the plurality of ports of the first storage array to generate a logical target port group state, and to send the logical target port group state to the host in response to the first target port group query;
   wherein non-unique actual target port IDs of the plurality of ports of the second storage array are translated to unique logical target port IDs.

2. The apparatus of claim 1 wherein the first storage array obtains target port state of the plurality of ports of the second storage array by forwarding the first target port group query to the second storage array.

3. The apparatus of claim 1 wherein the first storage array obtains target port state of the plurality of ports of the second storage array by sending a second target port group query to the second storage array.

4. The apparatus of claim 1 wherein the second storage array sends a target group state report for the plurality of ports of the second storage array to the first storage array.

5. The apparatus of claim 4 wherein the second storage array translates the actual port IDs of the plurality of ports of the second storage array into the unique logical port IDs which are used in the target port state of the plurality of ports of the second storage array sent to the first storage array.

6. The apparatus of claim 1 wherein the logical target port state indicates individual ports of the plurality of ports of the first storage array and the plurality of ports of the second storage array to be at least one of optimized, non-optimized, and inactive.

7. The apparatus of claim 1 wherein the host comprises an MPIO (Multipath Input-Output) driver that directs host access requests to host ports associated with the logical target port group.

8. The apparatus of claim 1 wherein the unique logical port IDs are used in the logical target port group state.

9. The apparatus of claim 8 wherein the processor translates the actual port IDs by concatenating the actual port IDs with at least a part of a serial number of the second storage array.

10. The apparatus of claim 8 wherein the processor translates the actual port IDs by concatenating the actual port IDs with a multiple of maximum port count.

11. A method comprising:
a first storage array presenting a first logical volume, the first storage array comprising a plurality of ports;
a second storage array presenting a second logical volume, where a replicated volume comprises the first logical volume and the second logical volume, the second storage array comprising a plurality of ports and being interconnected with the first storage array via a network; and
responsive to a first target port group query sent from a host to the first storage array:
obtaining target port state of the plurality of ports of the second storage array;
translating non-unique actual target port IDs of the plurality of ports of the second storage array to unique logical target port IDs;
combining the obtained target port state with target port state of the plurality of ports of the first storage array to generate a logical target port group state; and
sending the logical target port group state to the host.

12. The method of claim 11 comprising the first storage array obtaining the target port state of the plurality of ports of the second storage array by forwarding the first target port group query to the second storage array.

13. The method of claim 11 comprising the first storage array obtaining the target port state of the plurality of ports of the second storage array by sending a second target port group query to the second storage array.

14. The method of claim 11 comprising the second storage array sending a target group state report for the plurality of ports of the second storage array to the first storage array.

15. The method of claim 14 comprising the second storage array translating the actual port IDs of the plurality of ports of the second storage array into the unique logical port IDs which are used in the target port state of the plurality of ports of the second storage array sent to the first storage array.

16. The method of claim 11 comprising the logical target port state indicating individual ports of the plurality of ports of the first storage array and the plurality of ports of the second storage array to be at least one of optimized, non-optimized, and inactive.

17. The method of claim 11 comprising a host MPIO (Multipath Input-Output) driver directing host access requests to host ports associated with the logical target port group.

18. The method of claim 11 comprising using the unique logical port IDs in the logical target port group state.

19. The method of claim 18 comprising translating the actual port IDs by concatenating the actual port IDs with at least a part of a serial number of the second storage array.

20. The method of claim 11 comprising translating the actual port IDs by concatenating the actual port IDs with a multiple of maximum port count.

* * * * *